United States Patent Office 3,494,825
Patented Feb. 10, 1970

3,494,825
PROCESS FOR CHARGING FIBERS UNIFORMLY WITH PLASTICS
Paul Spielau, Spich, and Gerhard Bier, Troisdorf, Germany, assignors to Dynamit Nobel Aktiengesellschaft, Troisdorf, Germany
No Drawing. Continuation-in-part of application Ser. No. 663,900, Aug. 28, 1967, which is a continuation-in-part of application Ser. No. 601,430, Dec. 13, 1966. This application May 23, 1968, Ser. No. 731,646
Claims priority, application Germany, Oct. 2, 1963, D 42,621
Int. Cl. D21h *3/08;* D21d *3/00*
U.S. Cl. 162—166                                      8 Claims

ABSTRACT OF THE DISCLOSURE

Process for preparing uniformly coated fibers wherein cellulosic fibers which have been pretreated with a cationic-active melamine or urea resin are contacted with an aqueous dispersion of a mixture of (1) vinylchloride and/or vinylidene chloride with (2) vinylacetate, maleic acid anhydride, methacrylic acid ester, acrylic acid ester or a mixture thereof and thereafter the resultant batch is contacted with a permanent plasticizer and/or solvent having a swelling effect on the plastic and/or a highly volatile organic solvent not miscible with water. The plastic is utilized in an amount of from 10 to 150% referred to the amount of fibers and the plasticizer is used in an amount of from 10 to 60% referred to the plastic.

---

This application is a continuation-in-part of application Ser. No. 663,900 filed Aug. 28, 1967 now abandoned, which in turn, is a continuation-in-part of application Ser. No. 601,430 filed Dec. 13, 1966 now abandoned and which in turn is a continuation of application Ser. No. 398,050 filed Sept. 21, 1954 and now abandoned.

This invention relates to a process for applying plasticized synthetic plastics onto the surface of fibers suitable for use in the manufacture of paper, paper-like structures, felts and the like.

It is known to the art to supply plastics to paper pulp by adding the plastic to the paper stock and effecting the coagulation of the plastic in situ. The known processes, however, have the disadvantage that the coagulate adheres not at all or only very slightly to the fiber, thus rendering the fibers unsuitable for fabrication upon conventional paper-making equipment. For instance, it has been common that in the subsequent sheet forming process, different concentrations of plastics are produced on the top and the bottom sides of the paper. This is especially true in the case of relatively hard types of plastics. The adherence to the fibers can be improved by pretreatment with a melamine resin. This is accomplished without achieving any satisfactory adherence of the plastic which has additionally to be applied.

It is an object of the present invention to provide a process of applying plasticized synthetic plastics onto the surface of fibers suitable for use in the manufacture of paper-like structures avoiding the disadvantages of the prior known methods.

Another object of the present invention is to provide a process of applying plasticized synthetic plastics onto the surface of fibers suitable for use in the manufacture of paper-like structures, which fiber-plastic mixture is adaptable to conventional paper-making equipment.

These and other objects will become apparent in the course of the following specification and claims.

In accordance with the present invention it has now been found that plasticized plastics can be applied uniformly onto the surface of fibers which have previously been treated with amine resins by carrying out the coagulation of aqueous dispersions of the plasticized plastics by means of permanent plasticizers having a swelling effect on the plastics, and/or with high volatile organic solvents which are not miscible with water. On the addition of an emulsion of a specific plasticizer or an emulsion of a specific solvent or an emulsion of a mixture of the specific plasticizer and specific solvent to the aqueous dispersion of plastics while the dispersion is in actual contact with the fibers, the plastic dispersion is broken and the plastic is deposited on the fibers.

It is advantageous to use the plasticizers and/or solvents having a swelling effect on the plastics, in the form of their aqueous emulsions. Preferably, the same emulsifier as was used in producing the plastic dispersion, or one similar thereto is used in accordance with the invention.

The swelling agents for the plastics can be used in widely varying percentages, but it is preferable to use them in quantities of from 10 to 60%, and preferably from 20 to 40%, with reference to the amount of plastic.

Among the permanent plasticizers included within the present invention are phthalic acid esters such as phthalic acid dimethyl ester, phthalic acid diethyl ester and phthalic acid dibutyl ester, as well as carboxylic acid esters, such as triethyleneglycol-bis-2-ethylbutyrate, and esters of aliphatic dicarboxylic acids such as sebacic acid ester.

Among the suitable highly volatile organic solvents which are not miscible with water included within the present invention are toluene, trichloroethylene, benzene, toluol, higher boiling aromatic hydrocarbons and halogenated hydrocarbons such as trichloro ethane, 1,1-dichloro ethane, and 1,2-dichloro ethane.

Among the amine resins are, for example, melamine and urea resins.

The materials having a swelling effect on the plastics are added preferably in the form of an 0.5 to 5% aqueous emulsion with an emulsifier content of 2 to 10% with reference to the amount of plasticizer. As emulsifier, any of the conventional emulsifying agents may be employed, care being taken that cation-active and anion-active emulifying agents are not simultaneously employed in interfering amounts.

In general, it is best to add the emulsion of the permanent plasticizers having a swelling effect on the plastics in several portions or elsewise in a continuous fashion.

The pH of the fiber and plastic dispersion can amount to from 1 to 7, and preferably amounts of from 4 to 7, depending on the melamine resin used for the precondensation and the specific permanent plasticizer having a swelling effect on the plastic. A pH shift which usually acts to break the plastic dispersion can be avoided by the use of the process of the invention.

The polymers which are preferred as plastics for application to fibers are composed in the main of vinyl chloride or vinylidene chloride, and can contain vinyl acetate, maleic acid anhydride, methacrylic acid ester and acrylic acid ester, for example, as additional components. The homopolymers, copolymers or terpolymers are used individually or in mixtures with one another, and it is advantageous to use the same in quantities of from 10 to 150% with reference to the amount of fiber used.

The fibers to which the plastic has been applied as described herein can be worked into sheet form by conventional paper-making methods in conventional paper-making equipment either per se or in admixaure with other untreated fibers, and the plastic-treated fibers are in accordance with conventional practice heated to about 60 to 200° C. until the fibers are bonded at their crossing points. In addition, pressures of from about 50 to 200 atmospheres can be employed. An improvement of the mechanical values can be achieved by thermal fixation.

The invention is illustrated but not limited by the following examples. All of the amounts given in percentages hereinafter refer to percentages by weight.

EXAMPLE 1

A melamine resin was prepared as follows.

A mixture was formed from:         G.
    Formalin (37%) _____ 260
    Water _____ 70
    Acetone _____ 60
    Melamine _____ 140
    Soda lye (34%) _____ 1

This mixture was then subjected to heating. At 60° C. the mixture commenced to boil, this being indicative of the onset of the condensation reaction. After 2½ hours of boiling the reaction was completed. The mixture was allowed to cool. Analysis of a sample thereof indicated the following:

Viscosity _____ cp__ 20
Solid resin content _____ wt. percent__ 45
pH value _____ 9.0
B-time to 150° C. _____ min__ 15

(B-time designates the time required for the resin to pass from a viscous but liquid stage to a gelatinous rubber-like stage. The B-time is determined by storing a 0.5 g. sample of resin in an iron bowl at 150° C. in a drying oven. A thin iron rod is used for observing any changes in the nature of the material.)

5 grams birch sulfate pulp (dry weight) were macerated with 500 ml. water and thereafter adjusted with hydrochloric acid to a pH of from 1 to 2. 0.5 gram of the above melamine resin were then added to the resulting mixture.

The condensation was allowed to proceed for five hours and the pulp was then adjusted to a pH of from 4 to 5.5 grams of a copolymer of 86% vinyl chloride and 14% vinyl acetate, dispersed in 300 ml. of water were then added. 1.5 grams triethyleneglycol - bis-2-ethyl-butyrate were emulsified with 30 mg. of an alkylsulfonate in 100 ml. of water and the emulsion was added in several portions to the fiber and plastic dispersion.

After a short time, all of the plastic had been uniformly precipitated out onto the fibers and the filtrate remaining was substantially free of particles of plastic.

EXAMPLE 2

The procedure of Example 1 was repeated except that the polymer used was a copolymer of 80% vinyl chloride and 20% vinyl acetate. Triethyleneglycol-bis-2-ethybutyrate was used as the plasticizer in an amount of 30% with respect to the plastic used.

EXAMPLE 3

The procedure of Example 1 was repeated. The precipitating swelling agent was an emulsion of 1 gram dibutyl phthalate, 1.5 g. of toluene, 100 ml. of water and 30 mg. of alkylsulfonate. The fiber charging was uniform.

EXAMPLE 4

The procedure of Example 1 was repeated. An emulsion of 1 g. dibutyl phthalate, 2 g. arichloroethylene, 100 ml. water and 30 mg. sodium lauryl sulfonate was added as the precipitating agent.

EXAMPLE 5

The procedure of Example 1 was repeated, but in this instance the precipitation was brought about using a pure toluene emulsion consisting of 2.5 grams toluene, 100 ml. water and 30 mg. sodium lauryl sulfonate.

EXAMPLE 6

The procedure of Example 1 was repeated, but the cellulosic material was replaced by mechanical wood pulp. The plastic was triethyleneglycol-bis-2-ethyl butyrate in an amount of 40% referred to the content of plastic.

EXAMPLE 7

5 grams (dry weight) birch sulfate pulp were macerated with 500 ml. water and adjusted with hydrochloric acid to a pH of from 1 to 2. 0.5 gram of the resin described above in Example 1 dissolved in 50 ml. water were added to the pulp mixture. After 30 minutes, the pulp was adjusted to a pH of from 6 to 7, and 5 grams of a copolymer of 86% vinyl chloride and 14% vinyl acetaae in the form of a dispersion in 300 ml. of water were added thereto. 2.0 grams phthalic acid dibutyl ester were emulsified with 30 mg. alkylsulfonate and 100 ml. of water, and this emulsion was slowly added to the fiber-and-plastic dispersion. The plastic deposited out uniformly onto the fibers. The fiber dispersion was easily filterable, and the filtrate was free of plastic particles.

The condensation was allowed to proceed for five hours and the pulp was then adjusted to a pH of from 4 to 5. 5 grams of a copolymer of 86% vinyl chloride and 14% vinyl acetate, dispersed in 300 ml. of water were then added. 1.5 grams triethyleneglycol-bis-2-ethyl butyrate were emulsified with 30 mg. of an alkylsulfonate in 100 ml. of water and the emulsion was added in several portions to the fiber-and-plastic dispersion.

After a short time, all of the plastic had been uniformly precipitated out onto the fibers and the filtrate remaining was substantially free of particles of plastic.

EXAMPLE 8

5 grams (dry weight) birch sulfate pulp were macerated with 500 ml. water and adjusted with hydrochloric acid to a pH of from 1 to 2. 0.5 gram of the resin described in Example 1, dissolved in 50 ml. water, were added to the pulp mixture. After 30 minutes, the pulp was adjusted to a pH of from 6 to 7, and 5 grams of a copolymer of 86% vinyl chloride and 14% vinyl acetate in the form of a dispersion in 300 ml. of water were added thereto. 2.0 grams phthalic acid dibutyl ester were emulsified with 30 mg. alkylsulfonate and 100 ml. of water and this emulsion was slowly added to the fiber and plastic dispersion. The plastic deposited out uniformly onto the fibers. The fiber dispersion was easily filterable and the filtrate was free of plastic particles.

EXAMPLE 9

A urea resin was prepared as follows.

A mixture was formed from:         G.
    Formalin (30%) _____ 450
    Glycol _____ 5
    $Na_3PO_4$ _____ 0.4
    NaOH _____ 0.4

This mixture was then subjected to heating to 100° C. and thereafter adjusted with formic acid to a pH of 3.5. 100 g. urea was dissolved in 150 g. water. This solution was added to the above mixture at 100° C. After 30 minutes the condensation reaction was completed. Soda lye was introduced in the mixture, until the pH-value was 7.6. Water was removed by vacuum distillation, until the resin solution had a viscosity of 1000 cp. The solid resin content of the remaining solution was 72 wt. percent, B-time to 150° C.—9 min.

5 grams birch sulfate pulp (dry weight) were macerated with 500 ml. water and thereafter adjusted with hydrochloric acid to a pH of from 1 to 2. 0.4 gram of the above urea resin were then added to the resulting mixture.

The condensation was allowed to proceed for five hours and the pulp was then adjusted to a pH of from 4 to 5. 5 grams of a copolymer of 86% vinyl chloride and 14% vinyl acetate, in 300 ml. of water were then added. 1.5 grams triethyleneglycol-bis-2-ethyl-butyrate were emulsified with 30 mg. of an alkylsulfonate in 100 ml. of water and the emulsion was added in several portions to the fiber and plastic dispersion.

After a short time, all of the plastic had been uniformly precipitated out onto the fibers and the filtrate remaining was substantially free of particles of plastic.

We claim:

1. A process of preparing substantially uniformly plastic coated fibers which comprises forming an aqueous slurry of cellulosic fibers, adjusting the pH of said fiber slurry with hydrochloric acid to a value of about 1 to 2, introducing a cationic active amine resin selected from the group consisting of melamine and urea resins, condensing said resin in said mixture to the B-stage, thereafter contacting the resulting aqueous slurry of fibers with an aqueous dispersion of a plastic selected from the group consisting of vinylchloride, vinylidene chloride and mixtures thereof with a member selected from the group consisting of vinylacetate, maleic acid anhydride, methacrylic acid ester, acrylic acid ester and mixtures thereof and thereafter introducing into said mixture of water amine resin treated fibers and plastic a member selected from the group consisting of:
   (a) an aqueous emulsion of a permanent plasticizer having a swelling effect on said plastic selected from the group consisting of phthalic acid dimethyl ester, phthalic acid dibutyl ester, phthalic acid diethyl ester, triethylene glycol-bis-2-butyrate and sebacic acid ester,
   (b) an aqueous emulsion of a highly volatile water immiscible organic solvent selected from the group consisting of toluene, trichloroethylene, benzene, trichloroethane, 1,1-dichloroethane and 1,2-dichloroethane, and
   (c) an aqueous emulsion of a mixture of (a) and (b), wherein said plastic in said aqueous dispersion of plastic is utilized in an amount of from 10 to 150% referred to the amount of fibers and said plasticizer and/or solvent is utilized in an amount of from 10 to 60% referred to the amount of plastic in said aqueous dispersion of plastic whereby the plastic is uniformly precipitated onto said fibers and removing the water to provide the uniformly coated fibers.

2. Process according to claim 1 wherein said plasticizer and/or solvent is utilized in an amount of from 20 to 40% referred to the amount of plastic in said aqueous dispersion of plastic.

3. Process according to claim 1 wherein said aqueous emulsion is an 0.5 to 5% emulsion and contains from 2 to 10% of an emulsifying agent referred to the plasticizer and/or solvent present in said emulsion.

4. Process according to claim 1 which comprises adjusting the pH of said mixture of fibers and plastic to a pH of from 1 to 7.

5. Process according to claim 1 which comprises adjusting the pH of said mixture of fibers and plastic to a pH of from 4 to 7.

6. The substantially uniformly plastic coated fibers produced by the process of claim 1.

7. A process of making a paper sheet which comprises forming an aqueous slurry of cellulosic fibers, adjusting the pH of said fiber slurry with hydrochloric acid to a value of about 1 to 2, introducing a cationic active amine resin selected from the group consisting of melamine and urea resins, condensing said resin in said mixture to the B-stage, thereafter contacting the resulting aqueous slurry of fibers with an aqueous dispersion of a plastic selected from the group consisting of vinylchloride, vinylidene chloride and mixtures thereof with a member selected from the group consisting of vinylacetate, maleic acid anhydride, methacrylic acid ester, acrylic acid ester and mixtures thereof and thereafter introducing into said mixture of water amine resin treated fibers and plastic a member selected from the group consisting of:
   (a) an aqueous emulsion of a permanent plasticizer having a swelling effect on said plastic selected from the group consisting of phthalic acid dimethyl ester, phthalic acid dibutyl ester, phthalic acid diethyl ester, triethyleneglycol-bis-2-butyrate and sebacic acid ester,
   (b) an aqueous emulsion of a highly volatile water immiscible organic solvent selected from the group consisting of toluene, trichloroethylene, benzene, trichloroethane, 1,1-dichloroethane and 1,2-dichloroethane, and
   (c) an aqueous emulsion of a mixture of (a) and (b) wherein said plastic in said aqueous dispersion of plastic is utilized in an amount of from 10 to 150% referred to the amount of fibers and said plasticizer and/or solvent is utilized in an amount of from 10 to 60% referred to the amount of plastic in said aqueous dispersion of plastic whereby the plastic is uniformly precipitated onto said fibers, removing the water to provide the uniformly coated fibers, dewatering the resultant slurry of plastic coated fibers, subjecting the dewatered mixture to heat and pressure to form a sheet of paper.

8. A paper sheet produced by the process of claim 7.

References Cited

UNITED STATES PATENTS

| | | | |
|---|---|---|---|
| 1,901,930 | 3/1933 | Pieper et al. | 162—183 |
| 2,069,771 | 2/1937 | Pascoe et al. | 162—168 |
| 2,563,897 | 8/1951 | Wilson et al. | 162—166 |

S. LEON BASHORE, Primary Examiner

U.S. Cl. X.R.

162—182, 183